(12) United States Patent
Maibach et al.

(10) Patent No.: US 8,212,371 B2
(45) Date of Patent: Jul. 3, 2012

(54) ENERGY SYSTEM FOR PRODUCING DC VOLTAGE USING RECTIFIERS AND ENERGY STORAGE CIRCUITS

(75) Inventors: Philippe Maibach, Muhen (CH); Markus Eichler, Waldshut (DE); Peter Steimer, Ehrendingen (CH)

(73) Assignee: ABB Schweiz AG, Baden (CH)

( * ) Notice: Subject to any disclaimer, the term of this patent is extended or adjusted under 35 U.S.C. 154(b) by 365 days.

(21) Appl. No.: 12/391,578

(22) Filed: Feb. 24, 2009

(65) Prior Publication Data

US 2009/0212568 A1 Aug. 27, 2009

(30) Foreign Application Priority Data

Feb. 27, 2008 (EP) .................................. 08152006

(51) Int. Cl.
*H02P 9/04* (2006.01)
(52) U.S. Cl. ............................... 290/44; 290/55
(58) Field of Classification Search .............. 290/44, 290/55
See application file for complete search history.

(56) References Cited

U.S. PATENT DOCUMENTS

| | | | |
|---|---|---|---|
| 5,225,712 A | | 7/1993 | Erdman |
| 5,546,295 A | * | 8/1996 | Prete et al. ................ 363/17 |
| 6,946,750 B2 | * | 9/2005 | Wobben ..................... 290/44 |
| 7,180,270 B2 | * | 2/2007 | Rufer et al. ................ 322/20 |
| 7,420,288 B2 | * | 9/2008 | Calley ....................... 290/44 |
| 2003/0222459 A1 | * | 12/2003 | Harris et al. ............... 290/28 |
| 2009/0079193 A1 | * | 3/2009 | Nielsen et al. ............. 290/44 |

FOREIGN PATENT DOCUMENTS

| | | |
|---|---|---|
| DE | 10 2005 044 341 A1 | 4/2006 |
| EP | 1768223 A2 | 3/2007 |
| JP | 2004064928 | 2/2004 |
| JP | 2006238539 | 9/2006 |
| JP | 2007110789 | 4/2007 |
| WO | WO 02/15367 A1 | 2/2002 |
| WO | WO 02/15367 A1 | 2/2002 |
| WO | WO 2007/037140 | 4/2007 |

OTHER PUBLICATIONS

EP Search Report for EP 08152006.6 completed Aug. 21, 2008.
E. Ghiani et al., "Power Quality Measurements Performed on a Large Wind Park at Low and Medium Voltage Level", International Conference on Power Systems Transients (IPST '07), Jun. 4-7, 2007, Lyon,France.
F.G. Rossouw et al., "Use of Air-Coded Axial Flux Permanent Magnet Generator in Direct Battery Charging Wind Energy Systems", Power Electronics and Drive Systems, 7th Int'l. Conf. I.EEE, 2007 pp. 1102-1107.

* cited by examiner

*Primary Examiner* — Tho D Ta
(74) *Attorney, Agent, or Firm* — Buchanan Ingersoll & Rooney PC

(57) ABSTRACT

An energy system is specified, which comprises a wind power turbine or water power turbine, which is connected to a generator, with the generator having at least two stator windings. In order to achieve a simple and robust design without a transformer, each stator winding has an associated rectifier unit, and each stator winding is connected to the AC voltage side of the associated rectifier unit. Furthermore, each rectifier unit has a respective associated energy storage circuit, and each rectifier unit is connected in parallel on the DC voltage side to the associated energy storage circuit, with the energy storage circuits being connected to one another in series.

18 Claims, 4 Drawing Sheets

ENERGY SYSTEM FOR PRODUCING DC VOLTAGE USING RECTIFIERS AND ENERGY STORAGE CIRCUITS

RELATED APPLICATION

This application claims priority under 35 U.S.C. §119 to European Patent Application No. 08152006.6 filed in Europe on Feb. 27, 2008, the entire content of which is hereby incorporated by reference in its entirety.

TECHNICAL FIELD

The disclosure relates to the field of renewable energies and is based on an energy system.

BACKGROUND INFORMATION

Wind energy systems, as are now being increasingly used as alternative energy supplies as a result of disappearing energy resources, are conventionally installed on land or in the sea close to the coast. Tidal power energy systems are in turn typically installed on the seabed, while the tidal range or the flow of the sea water is used as the primary energy source.

A wind energy system of this generic type is specified in "Power Quality Measurements Performed on a Large Wind Park at Low and Medium Voltage Level", E. Ghiani et al., International Conference on Power System Transients, Jun. 4-7, 2007. In this document, the wind energy system has a wind power turbine, which is connected to a generator, with the generator typically having at least two stator windings. The stator windings are connected to a transformer which is used to produce a high AC voltage, as a result of which the electrical energy associated with this can then be transported onwards with no losses and efficiently.

However, particularly in the case of wind energy systems which are installed off-shore in the sea, or in the case of tidal power energy systems which are typically installed under the water surface, a transformer, in particular oil transformers, is undesirable for installation reasons and for maintenance reasons. Furthermore, the failure rates and the susceptibility of the energy system faults rise sharply, and the availability decreases accordingly, if the transformer is not adequately and regularly maintained.

SUMMARY

An energy system of simple design is disclosed, which is robust and does not require a transformer.

An energy system comprising a wind power turbine or water power turbine, which is connected to a generator, with the generator having at least two stator windings and with a respective rectifier unit being associated with each stator winding, and with each stator winding being connected to the AC voltage side of the associated rectifier unit, wherein each rectifier unit has a respective associated energy storage circuit, and each rectifier unit is connected in parallel on the DC voltage side to the associated energy storage circuit, and wherein the energy storage circuits are connected to one another in series.

In another aspect, a generator configurable within a power-turbine energy system is disclosed. Such a generator comprises a plurality of stator windings; a rectifier unit associated with each respective one of the stator windings, each stator winding being connected to an AC voltage side of the associated rectifier unit; and an energy storage circuit associated with each respective one of the rectifier units, each rectifier unit being connected in parallel on a DC voltage side to the associated energy storage circuit, wherein the energy storage circuits are electrically configured in series.

These and further objects, advantages and features of the present disclosure will become evident from the following detailed description of exemplary embodiments of the disclosure, in conjunction with the drawing.

Figure 1:
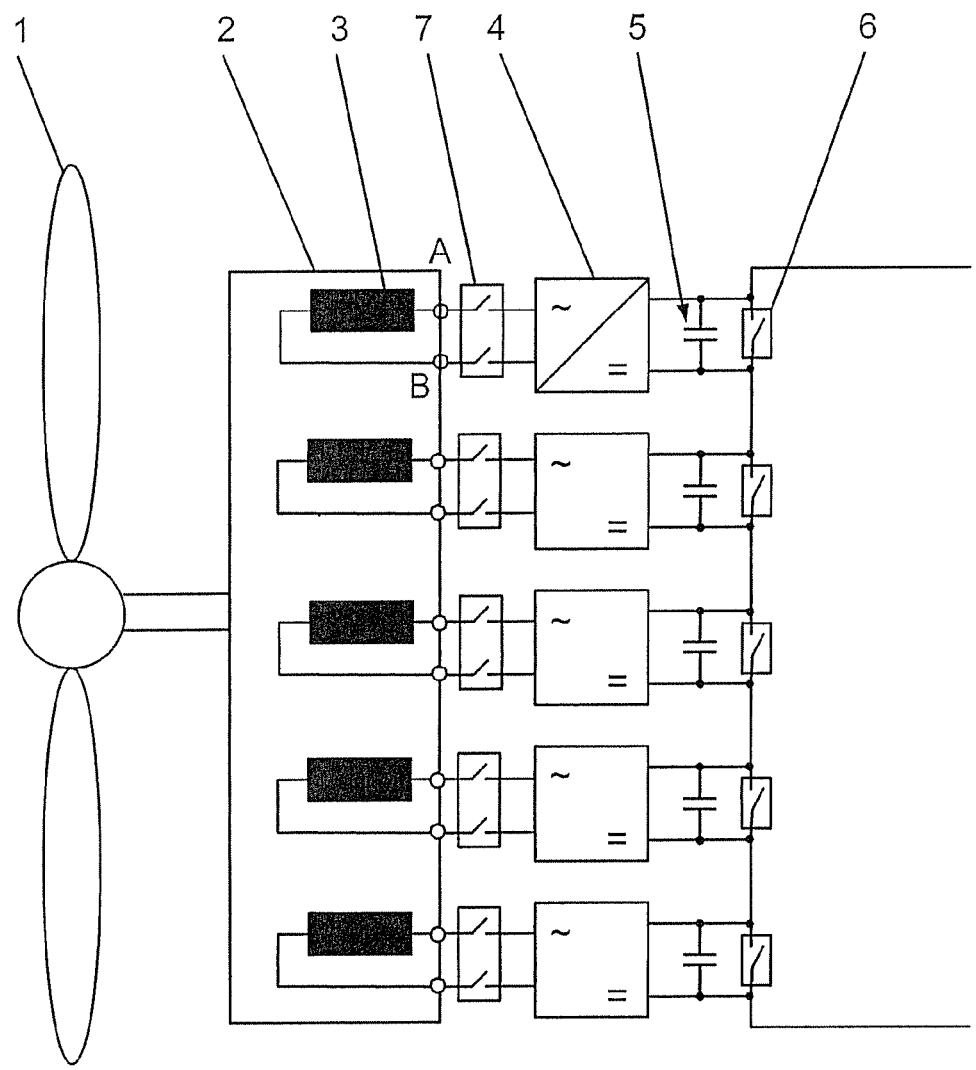
FIG. 1 shows a first exemplary embodiment of the energy system according to the disclosure.

The reference symbols used in the drawing, and their meanings, are listed in a summarized form in the list of reference symbols. In principle, identical parts are provided with the same reference symbols in the figures. The described exemplary embodiments represent examples of the subject matter according to the disclosure, and have no restrictive effect.

DETAILED DESCRIPTION

The energy system according to the disclosure comprises a wind power turbine or water power turbine, which is connected to a generator, with the generator having at least two stator windings. According to the disclosure, each stator winding now has a respectively associated rectifier unit, and each stator winding is connected to the AC voltage side of the associated rectifier unit. The number of rectifier units therefore corresponds to the number of stator windings. Furthermore, each rectifier unit has a respective associated energy storage circuit, and each rectifier unit is connected in parallel on the DC voltage side to the associated energy storage circuit. The number of energy storage circuits therefore corresponds to the number of rectifier units. Furthermore, the energy storage circuits are connected to one another in series. The at least two rectifier units produce a DC voltage on the respective DC voltage side, that is to say across the associated energy storage circuit, with the series connection of the energy storage circuits resulting in the DC voltages being added, thus advantageously resulting in a high total DC voltage across the energy storage circuits. A transformer for producing a high AC voltage therefore becomes superfluous, and can advantageously be saved. By way of example, the electrical energy relating to this can be transported onwards with no losses and efficiently by means of a medium-voltage, direct-current transmission or a high-voltage, direct-current transmission (HVDCT). Since the energy system according to the disclosure does not have a transformer, this also saves complex installation and maintenance, as a result of which, overall, the energy system is simpler and more robust and is distinguished by high availability.

FIG. 1 illustrates a first exemplary embodiment of the energy system according to the disclosure. The energy system comprises a wind power turbine 1, for example in the case of a wind energy system, or a water power turbine 1, for example in the case of a tidal power energy system, which is connected to a generator 2, with the generator 2 having at least two stator windings 3. Any type of generator, such as a synchronous machine, an asynchronous machine, a permanent-magnet machine, a reductance machine, etc., is feasible. According to the disclosure, in general each stator winding 3 now has a respectively associated rectifier unit 4, and each stator winding 3 is connected to the AC voltage side of the associated rectifier unit 4. The number of rectifier units 4 accordingly corresponds to the number of stator windings 3. Furthermore, each rectifier unit 4 has a respectively associated energy storage circuit 5, and each rectifier unit 4 is connected in parallel with the associated energy storage circuit 5 on the DC voltage side. The number of energy storage circuits 5 therefore corresponds to the number of rectifier units 4. Furthermore, the energy storage circuits 5 are connected to one another in series. The exemplary embodiment shown in FIG. 1, for example, has five stator windings 3, and therefore also five rectifier units 4, and therefore also five energy storage circuits 5. The generally at least two rectifier units 4 produce a DC voltage on the respective DC voltage side, that is to say across the associated energy storage circuit 5, with the series connection of the energy storage circuits 5 resulting in the DC voltages being added, thus advantageously resulting in a high total DC voltage across the energy storage circuits 5. A transformer for producing a high AC voltage therefore becomes superfluous, and can advantageously be saved. Furthermore, the number and the cross section of the required cables which must be laid to the energy system connection point are reduced. By way of example, the electrical energy relating to this can be transported onwards with no losses and efficiently with the aid of medium-voltage, direct-current transmission or high-voltage, direct-current transmission (HVDCT), in particular in the case of a wind energy system or in the case of a tidal power energy system, for example, in this case to terra firma. Since the energy system according to the disclosure does not have a transformer, this also saves complex installation and maintenance, as a result of which the energy system is simpler and more robust overall, and is distinguished by high availability. The rectifier units 4 are each in the form of two half-bridge circuits, that is to say one full-bridge circuit. According to the first exemplary embodiment of the energy system according to the disclosure as shown in FIG. 1, or else according to a second, third and fourth exemplary embodiment as shown respectively in FIG. 2, FIG. 3 and FIG. 4, which will be described in more detail in the following text, each rectifier unit 4 is in general in the form of an active rectifier unit 4 with controllable power semiconductor switches, that is to say the full-bridge circuit comprises controllable power semiconductor switches. The advantage of the active rectifier unit 4 is that the generator 2 can be controlled better in the event of load changes caused, for example, by wind gusts or flow changes. Furthermore, it is possible to drive the generator 4 as a motor, in order to position the rotor star for rotor-blade mounting. As an alternative and as a further simplification, particularly in order to reduce the drive complexity, it is also feasible, in general, for each rectifier unit 4 to be in the form of a passive rectifier unit 4 with passive non-controllable power semiconductor switches, that is to say the full-bridge circuit comprises only passive non-controllable power semiconductor switches, for example power diodes. If the rectifier unit 4 is in the form of a passive rectifier unit 4 and the generator is, for example, in the form of a permanent-magnet machine, then a capacitor 8 can be connected in series between the stator winding 3 and the passive rectifier unit 4, thus making it possible to achieve operation with a high power factor. The circuitry of a capacitor 8 such as this is illustrated in a fourth exemplary embodiment as shown in FIG. 4. Furthermore, it is feasible for each rectifier unit 4 in general to be in the form of a multipoint converter for switching a multiplicity of switching voltage levels.

According to FIG. 1, the energy storage circuit 5 has a capacitive energy store, thus making it possible to produce an extremely simple energy storage circuit. As an alternative to this, and according to the second exemplary embodiment of the energy system according to the disclosure as illustrated in FIG. 2 and according to the third exemplary embodiment of the energy system according to the disclosure as shown in FIG. 3, it is also feasible for the energy storage circuit 5 to have a first capacitive energy store and a second capacitive energy store, which is connected in series with the first capacitive energy store, thus advantageously making it possible to achieve a higher DC voltage per energy storage circuit 5.

Figure 2:
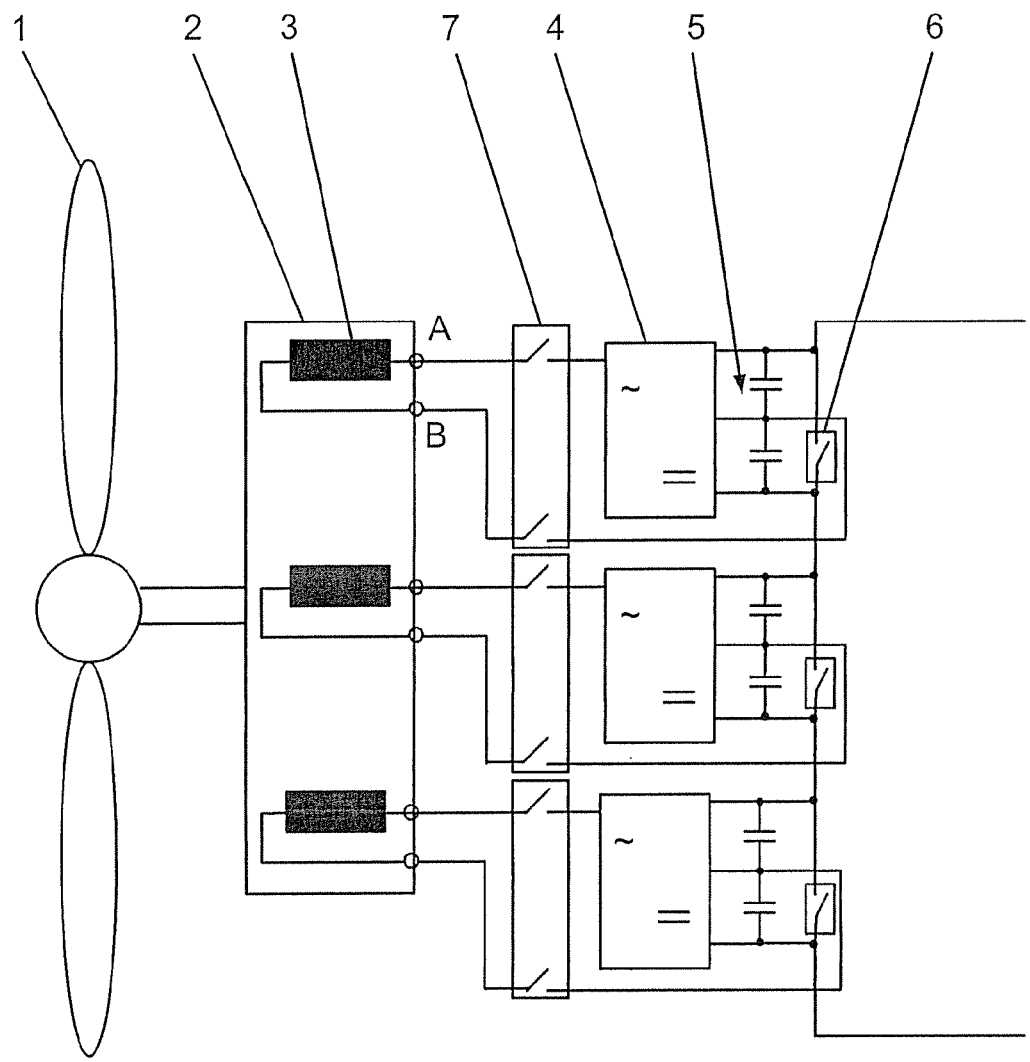
FIG. 2 shows a second exemplary embodiment of the energy system according to the disclosure.

According to FIG. 2, each stator winding 3 has a first connection A and a second connection B, with the first connection A being connected to the AC voltage side of the associated rectifier unit 4, and with the second connection B being connected to the junction point of the first capacitive energy store and the second capacitive energy store. The respective rectifier unit 4 as shown in FIG. 2 can preferably be in the form of a single half-bridge circuit, as a result of which it is possible to save power semiconductor switches for the respective rectifier unit 4 which is in the form of a full-bridge circuit. Overall, this therefore simplifies the energy system further.

Figure 3:
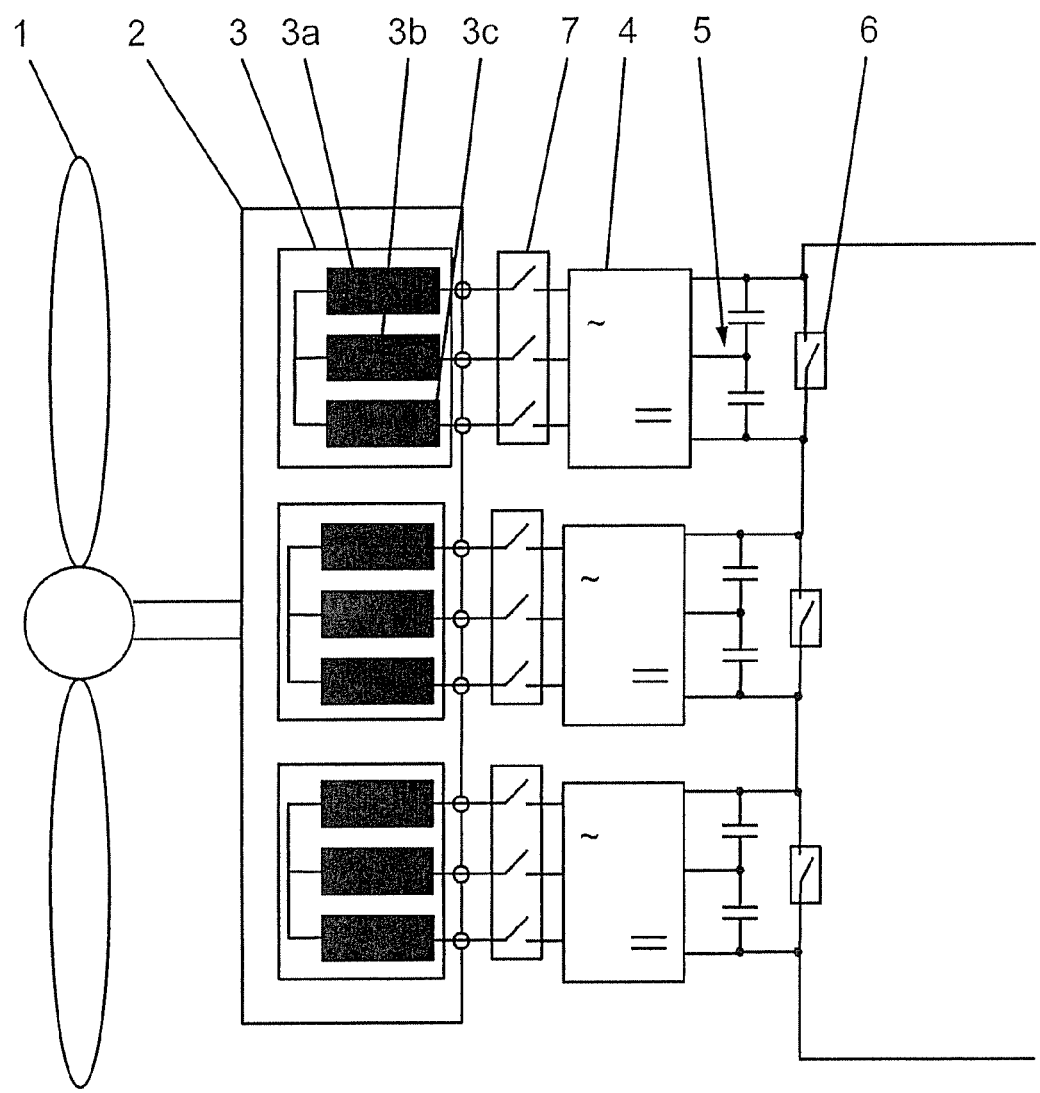
FIG. 3 shows a third exemplary embodiment of the energy system according to the disclosure.
Figure 4:
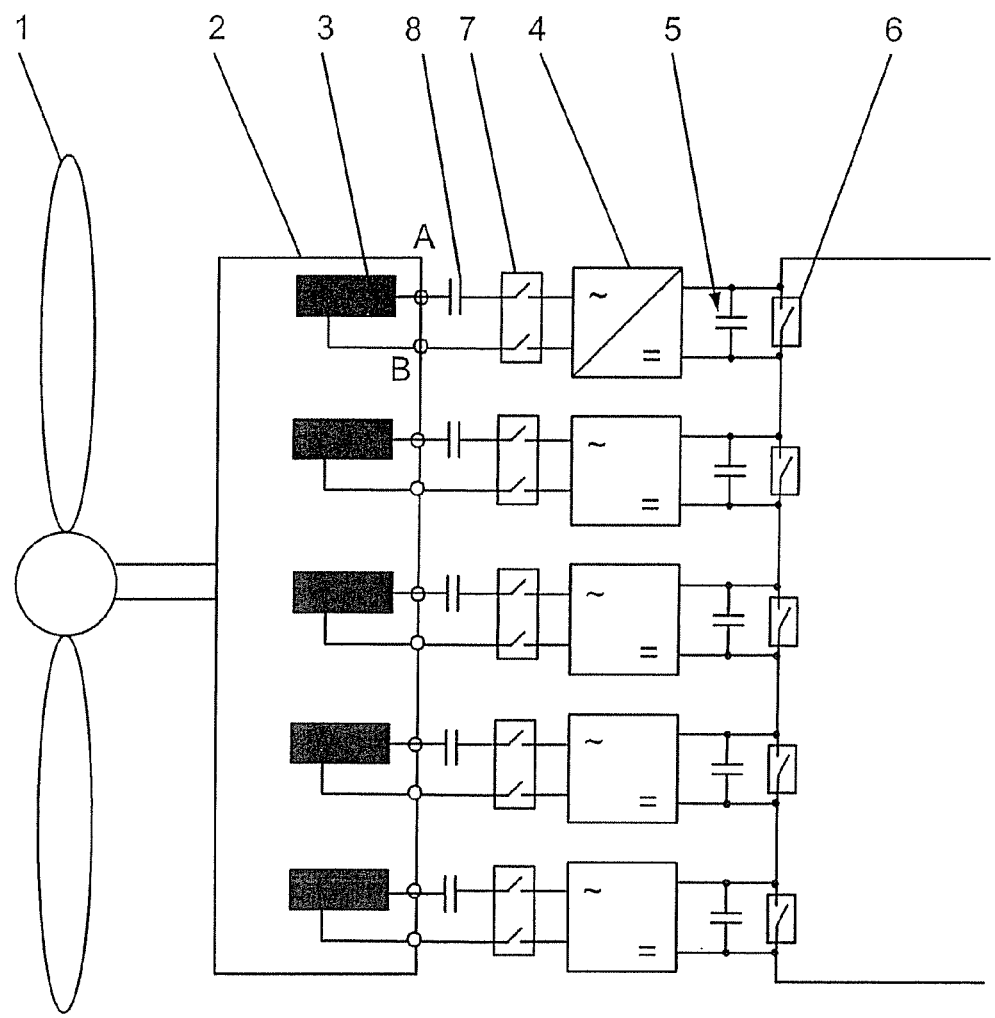
FIG. 4 shows a fourth exemplary embodiment of the energy system according to the disclosure.

As shown in FIG. 3, each stator winding 3 is formed by three winding elements 3a, 3b, 3c, and each winding element 3a, 3b, 3c is connected to the AC voltage side of the rectifier unit 4 associated with the respective stator winding 3. The three winding elements 3a, 3b, 3c can be connected in a star circuit, as shown in FIG. 3.

In the event of a fault, for example of a rectifier unit 4, and as shown in FIG. 1, FIG. 2, FIG. 3 and FIG. 4, a short-circuiting means 6 is connected in parallel with each energy storage circuit 5 and then allows the associated energy storage circuit 5 to be short-circuited. Further operation of the energy system is advantageously possible although, of course, the total DC voltage across all the energy storage circuits 5 is then reduced. The reduction in the total DC voltage in the event of a fault can be provided by suitable design of the energy system such that, even if one G energy storage circuit 5 is short-circuited, the weighted total DC voltage can be produced by the remaining rectifier units 4. Furthermore, as shown in FIG. 1, FIG. 2, FIG. 3 and FIG. 4, an isolating means 7 is connected in each connection to the stator winding 3, with the isolating means 7 being used for galvanic isolation of the stator winding 3. For example, in the event of a fault in a stator winding 3, this stator winding 3 can advantageously be isolated. Furthermore, by short-circuiting one energy storage circuit 5 by means of the associated short-circuiting means 6 and by at the same time isolating the associated stator winding 3 by means of the isolating means 7, the associated rectifier unit 4 can be isolated, for example for maintenance or test purposes, and/or in order to replace it.

It will be appreciated by those skilled in the art that the present invention can be embodied in other specific forms without departing from the spirit or essential characteristics thereof. The presently disclosed exemplary embodiments are therefore considered in all respects to be illustrative and not restricted. The scope of the invention is indicated by the appended claims rather than the foregoing description and all changes that come within the meaning and range and equivalence thereof are intended to be embraced therein.

LIST OF REFERENCE SYMBOLS

| 1 | Wind power turbine or water power turbine |
|---|---|
| 2 | Generator |
| 3 | Stator winding |
| 3a, 3b, 3c | Winding elements of the stator winding |
| 4 | Rectifier unit |
| 5 | Energy storage circuit |
| 6 | Short-circuiting means |
| 7 | Isolating means |
| 8 | Capacitor |

What is claimed is:

1. An energy system comprising:
a wind power turbine or water power turbine, which is connected to a generator, with the generator having at least two stator windings and with a respective rectifier unit being associated with each stator winding, and with each stator winding being connected to an AC voltage side of the associated rectifier unit,
wherein each rectifier unit has a respective associated energy storage circuit, and each rectifier unit is connected in parallel on a DC voltage side to the associated energy storage circuit, and
wherein the energy storage circuits are connected to one another in series.

2. The energy system as claimed in claim 1, wherein the energy storage circuit has a capacitive energy store.

3. The energy system as claimed in claim 1, wherein the energy storage circuit has a first capacitive energy store and a second capacitive energy store, which is connected in series with the first capacitive energy store.

4. The energy system as claimed in claim 3, wherein each stator winding has a first connection and a second connection, and wherein the first connection is connected to the AC voltage side of the associated rectifier unit, and the second connection is connected to the junction point of the first capacitive energy store and the second capacitive energy store.

5. The energy system as claimed in claim 1, wherein each stator winding is formed by three winding elements, and wherein each winding element is connected to the AC voltage side of the rectifier unit associated with the respective stator winding.

6. The energy system as claimed in claim 1, wherein a short-circuiting means is connected in parallel with each energy storage circuit.

7. The energy system as claimed in claim 1, wherein an isolating means is connected in each connection to the stator winding, with the isolating means being used for galvanic isolation of the stator winding.

8. The energy system as claimed in claim 1, wherein each rectifier unit is in the form of an active rectifier unit with controllable power semiconductor switches.

9. The energy system as claimed in claim 1, wherein each rectifier unit is in the form of a passive rectifier unit with passive non-controllable power semiconductor switches.

10. The energy system as claimed in claim 9, wherein a capacitor is connected in series between the stator winding and the passive rectifier unit.

11. The energy system as claimed in claim 8, wherein each rectifier unit is in the form of a multipoint converter for switching a multiplicity of switching voltage levels.

12. The energy system as claimed in claim 3, wherein each stator winding is formed by three winding elements, and wherein each winding element is connected to the AC voltage side of the rectifier unit associated with the respective stator winding.

13. The energy system as claimed in claim 5, wherein a short-circuiting means is connected in parallel with each energy storage circuit.

14. The energy system as claimed in claim 6, wherein an isolating means is connected in each connection to the stator winding, with the isolating means being used for galvanic isolation of the stator winding.

15. The energy system as claimed in claim 7, wherein each rectifier unit is in the form of an active rectifier unit with controllable power semiconductor switches.

16. The energy system as claimed in claim 7, wherein each rectifier unit is in the form of a passive rectifier unit with passive non-controllable power semiconductor switches.

17. The energy system as claimed in claim 10, wherein each rectifier unit is in the form of a multipoint converter for switching a multiplicity of switching voltage levels.

18. A generator configurable within a power-turbine energy system, the generator comprising:
a plurality of stator windings;
a rectifier unit associated with each respective one of the stator windings, each stator winding being connected to an AC voltage side of the associated rectifier unit; and
an energy storage circuit associated with each respective one of the rectifier units, each rectifier unit being connected in parallel on a DC voltage side to the associated energy storage circuit, wherein the energy storage circuits are electrically configured in series.

* * * * *